No. 689,324.　　　　　　　　　　　　　　　Patented Dec. 17, 1901.
S. B. & J. F. RITTENHOUSE.
MOLE TRAP.
(Application filed Feb. 28, 1901.)

(No Model.)

Witnesses
R. F. Storm
J. J. Masson

Inventors
Silas B. Rittenhouse
and James F. Rittenhouse
By E. E. Masson　Attorney

UNITED STATES PATENT OFFICE.

SILAS B. RITTENHOUSE AND JAMES F. RITTENHOUSE, OF LIBERTY MILLS, INDIANA.

MOLE-TRAP.

SPECIFICATION forming part of Letters Patent No. 689,324, dated December 17, 1901.

Application filed February 28, 1901. Serial No. 49,276. (No model.)

*To all whom it may concern:*

Be it known that we, SILAS B. RITTENHOUSE and JAMES F. RITTENHOUSE, citizens of the United States, residing at Liberty Mills, in the county of Wabash and State of Indiana, have invented certain new and useful Improvements in Mole-Traps, of which the following is a specification, reference being had therein to the accompanying drawings.

This invention relates to impalement-traps the prongs of which are intended to pierce and kill moles and other small animals, said prongs being carried by a suitable frame adapted to slide and be spring-propelled down along one of the anchoring vertical guide-rods, which are thrust into the ground alongside of the burrow of the mole.

The objects of our invention are to provide the trap with two continuous anchoring-rods, one of which serves as a guide for the spring-propelled sliding frame and the other serves not only as a pivot-support for the tripping-plate, but also as a side support for said plate, so that it can swing in only one direction—viz., toward or away from the outer end of the trigger—and said trigger is provided in the side of its inner end with a rectangular notch, the top and bottom edges of which are for the sliding frame to actuate the trigger while said frame is pulled up and render the trap substantially self-setting, as there is no need to handle the tripping-plate nor the trigger while causing an engagement of said parts while pulling up the sliding frame. We attain these objects by the construction illustrated in the accompanying drawings, in which—

Figure 1:
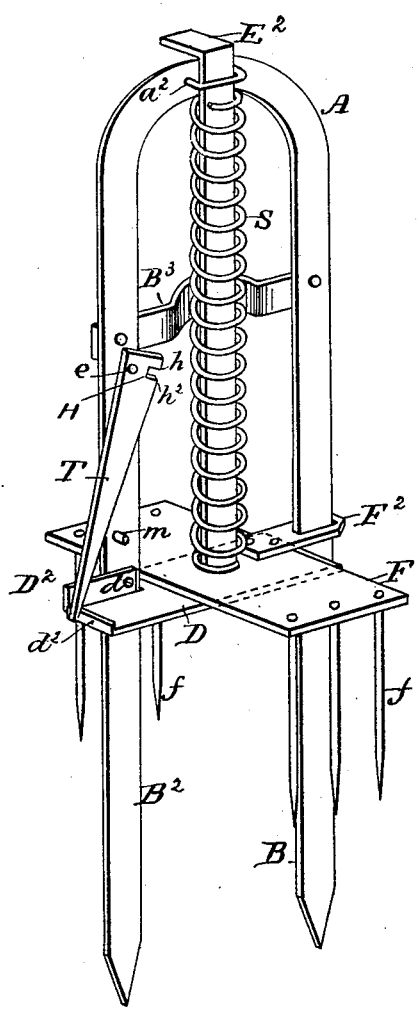
Figure 2:
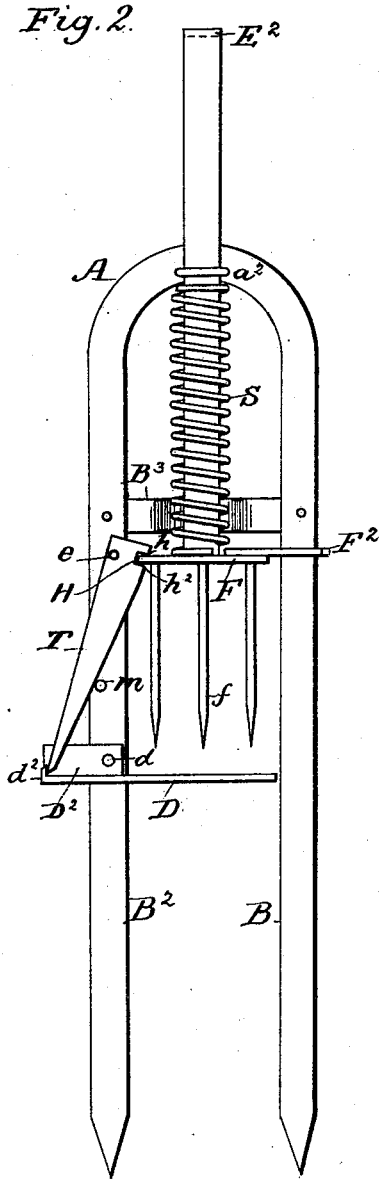

Figure 1 is a perspective view of the trap unset, with the prongs-frame nearly resting upon the tripping-plate. Fig. 2 is a side view of the trap set, having the prongs-frame elevated and the trigger in engagement with the tripping-plate.

In said drawings, A represents the main frame of the trap, consisting of a flat bar of metal bent upon its edge like a horseshoe to obtain inexpensively an arched frame and two rods B and $B^2$, pointed at their lower ends, to be driven part way in the ground and used as anchors for the trap. The rod B serves also as a guideway for the vertically-sliding parts of the trap, while the rod $B^2$ has the tripping-plate D pivoted thereto upon the pin $d$, passing through its vertical wing $D^2$ and through said rod $B^2$. The flat face of the wing $D^2$ being parallel with the face of the rod $B^2$, said tripping-plate D can swing only in one direction—viz., toward or away from the outer end of the trigger T, so that the turned-up lip $d^2$ on the shorter end of the tripping-plate is always at right angles to the face of the rod $B^2$, in proper location to engage with the outer end of said trigger. For the same reason the pivoted end or inner end of the trigger T, mounted upon the pivot-pin $e$, is retained by said pin parallel with the face of the rod $B^2$, and thus the outer end of the trigger is adapted to always drop into engagement with the turned-up lip $d^2$ of the tripping-plate without any necessity of handling either the trigger or the tripping-plate. To further insure said engagement, even if the trigger happens to be rusted on its pivot, and to render the trigger self-set and positively operated by the prongs-carrying plate F, said trigger has on its inner edge adjacent to its upper end a rectangular notch H, the upper shoulder $h$ of which enters into engagement with the top of the plate F when the latter is pulled up and the bottom shoulder $h^2$ enters into engagement with the bottom of the plate F after having the lower end of the trigger in engagement with the turned-up lip $d^2$ of the tripping-plate.

The vertically-sliding frame of the trap consists of a flat rod E, that is retained vertically connected to the frame A by means of the staple $a^2$, loosely encircling said rod E and having its ends passing through perforations made in the central portion of the arched frame A. The rod E has secured in a horizontal position to its lower end the plate F, each end of which is provided with a row of prongs $f$, intended to pierce and kill any mole which may, while lifting the top of its burrow, slightly lift the outer end of the tripping-plate D and release the trigger T. To guide the lower end of the rod E or its horizontal foot-plate F, the latter has secured to one of its sides an arm $F^2$, which has a rectangular slot to receive loosely the anchoring-rod B of the frame and be guided thereby.

To elevate the rod E and its foot-plate F to set the trap, the upper end of said rod E is bent laterally as a hook $E^2$, under which the operator can place one of his fingers and lift it until the free end of the trigger T has been swung down and entered into engagement with the lip $d^2$ of the tripping-plate. To prevent the lower end of the trigger from swinging too far inwardly and prevent its acute end from engaging with the surface of the tripping-plate, a pin $m$ projects from the face of the anchoring-rod $B^2$ and is in the way of the back edge of the trigger.

To retain the anchoring-rods B and $B^2$ of the frame parallel to each other, so that one of them can be relied upon as a guide for the sliding frame of the trap, they are united together with a bar $B^3$, located above the prongs-carrying plate F of the sliding frame. Said bar is bent laterally in its center for the free passage of the propelling-spring S. Said spring is in the form of a cylindrically-coiled wire surrounding the vertical rod E and having its lower end resting upon the top of the plate F, while its upper end bears against the bottom edge of the arched frame A.

Having now fully described our invention, we claim—

1. The combination of a trap-frame consisting of a flat bar bent on its edge and arched, terminating into two flat anchoring-rods having pointed ends, a tripping-plate provided with a side wing resting flat against, and pivoted to one of said anchoring-rods, and a turned-up lip on its shorter end, a vertically-sliding frame consisting of a central vertical rod and a prongs-carrying plate, a coiled spring pressing against said plate, a trigger having its upper end pivoted to one of the anchoring-rods and having a rectangular notch in its inner edge, the upper and lower shoulders of said notch being adapted to engage with the top and bottom surfaces of the prongs-carrying plate substantially as described and for the purpose set forth.

2. The combination of a trap-frame having two anchoring-rods, a tripping-plate pivoted to one of said rods and provided with a turned-up lip on its shorter end, a vertically-sliding frame having a central rod and a prongs-carrying plate, and a trigger having its upper end pivoted to one of the anchoring-rods and provided with a rectangular notch in its inner edge, the upper and lower shoulders of said notch being adapted to engage the prongs-carrying plate, substantially as described.

3. The combination of a trap-frame having two anchoring-rods, the tripping-plate pivoted to one of said rods and provided with a turned-up lip on its shorter end, a vertically-sliding frame having a central rod and a prongs-carrying plate, a coiled spring surrounding said central rod, and a trigger having its upper end pivoted to one of the anchoring-rods and provided with a rectangular notch in its edge, the upper and lower shoulders of said notch being adapted to engage the top and bottom faces of the prongs-carrying plate, one of the anchoring-rods having also a pin $m$ projecting therefrom in the path of the inner edge of the trigger, substantially as described.

In testimony whereof we affix our signatures in presence of two witnesses.

SILAS B. RITTENHOUSE.
JAMES F. RITTENHOUSE.

Witnesses:
MAUD RITTENHOUSE,
CLARISSA L. RITTENHOUSE.